Dec. 24, 1968    A. A. COWAN    3,417,784
SHUTOFF AND DRAIN VALVE
Filed Nov. 14, 1966    2 Sheets-Sheet 2
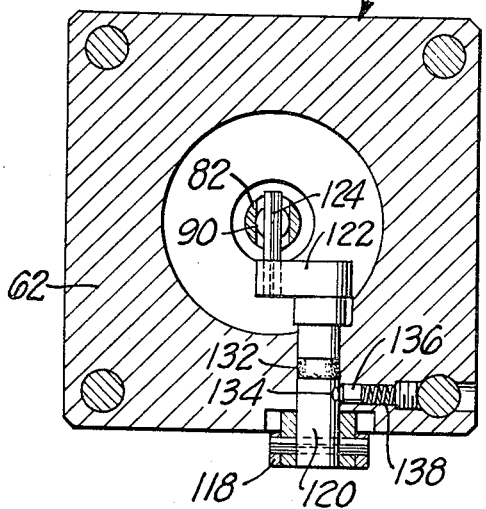
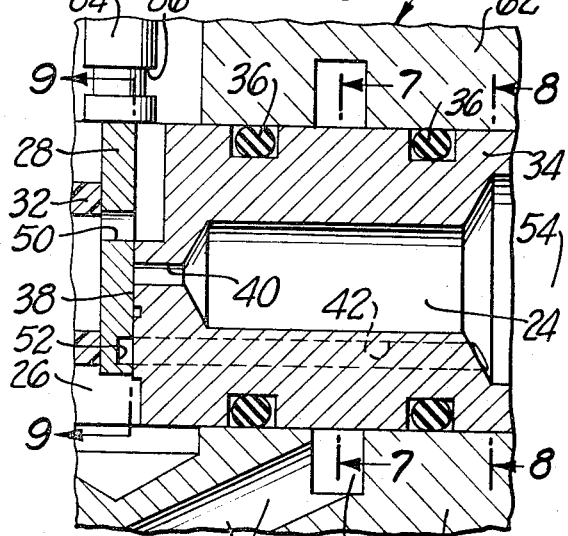
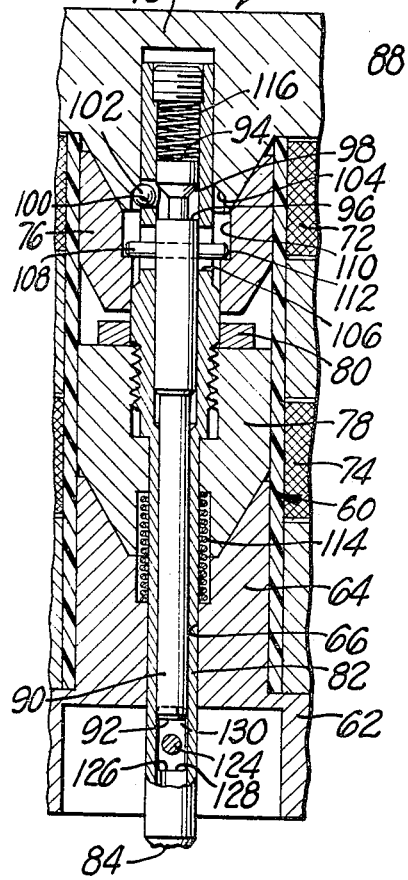
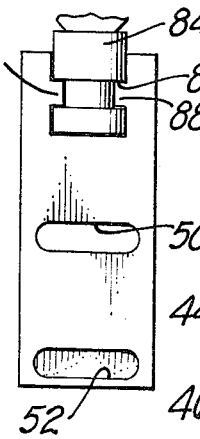
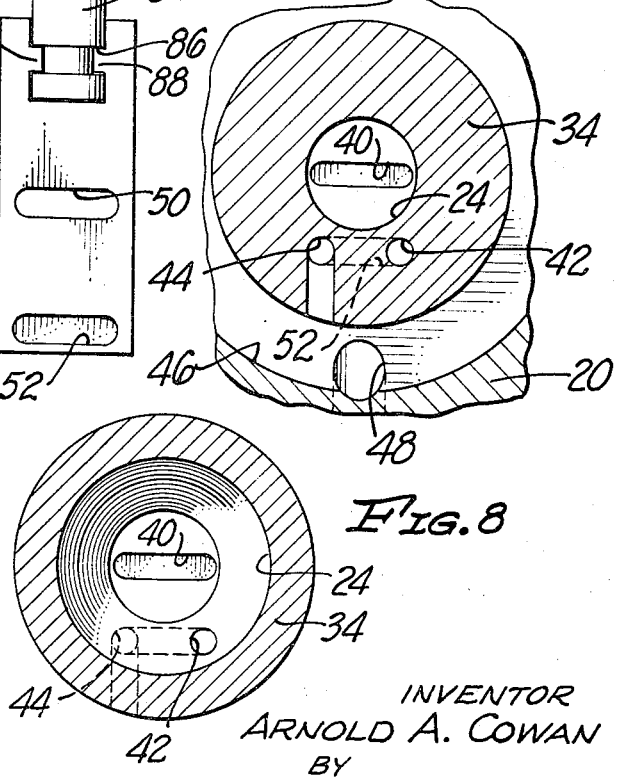
INVENTOR
ARNOLD A. COWAN
BY
MAHONEY & HORNBAKER
ATTORNEYS United States Patent Office 3,417,784
Patented Dec. 24, 1968

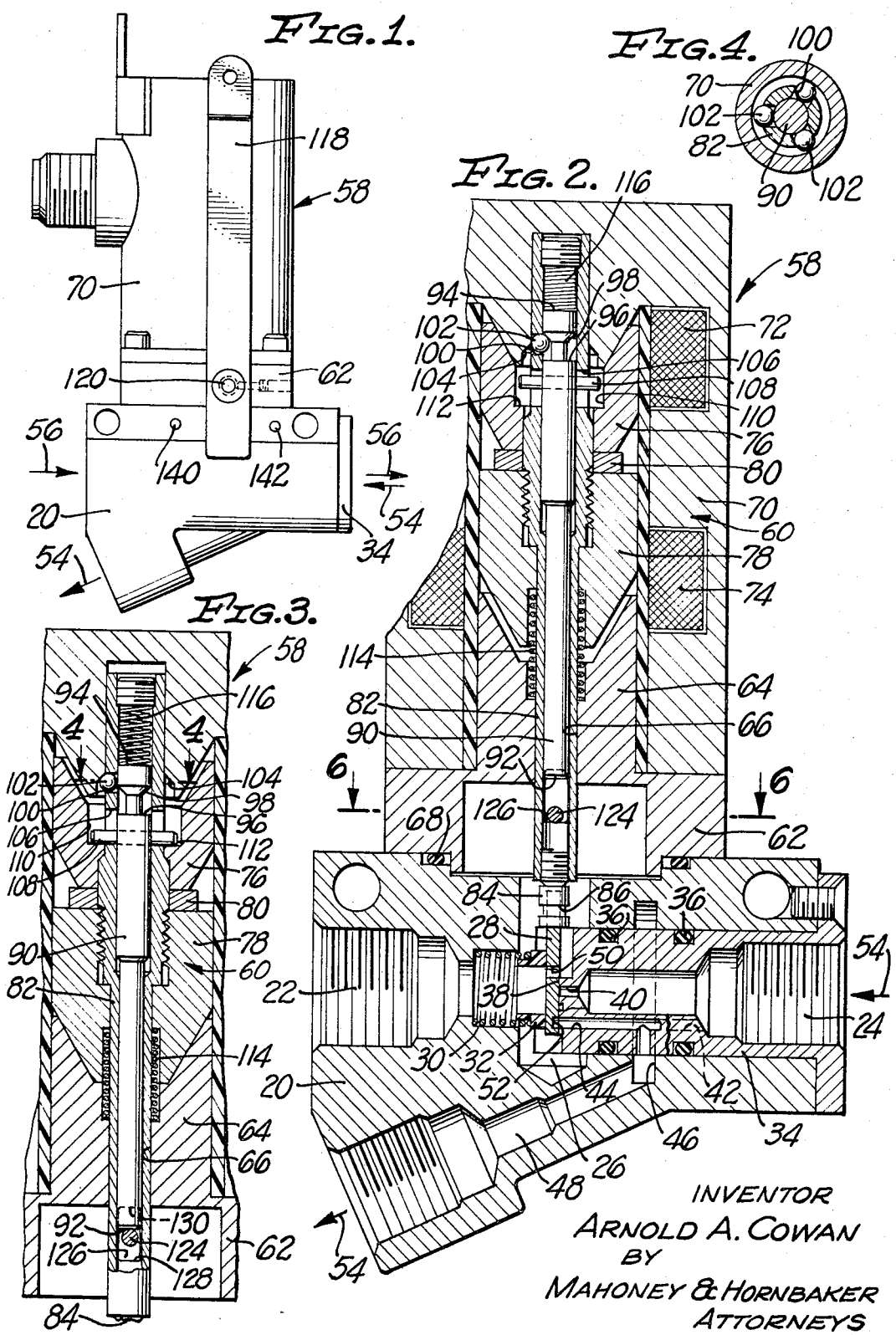

3,417,784
SHUTOFF AND DRAIN VALVE
Arnold A. Cowan, Tarzana, Calif., assignor, by mesne assignments, to The Bobrick Corporation, North Hollywood, Calif., a corporation of California
Filed Nov. 14, 1966, Ser. No. 593,911
12 Claims. (Cl. 137—625.65)

ABSTRACT OF THE DISCLOSURE

A drain is arranged at the outlet side of the solenoid actuated valve for automatically draining the valve and any connected outlet lines when the valve is closed. Mechanism is included in the valve for positively latching it in each of its open and closed positions until it is solenoid actuated to its opposite position. Manual operating means may be incorporated overriding the solenoid actuation of the valve, said manual operating means when operated preferably conditioning the solenoid actuating means inoperative.

---

This invention relates to a shutoff and drain valve and more particularly, to a shutoff and drain valve which may be solenoid actuated between open and closed positions thereof, and which automatically drains fluids passing through the valve from the lines connected to the outlet or downstream sides thereof when the valve is in closed position. Even more particularly, this invention relates to a shutoff and drain valve of the foregoing type which may include mechanism for positively, although releasably, latching the valve in each of the open and closed positions, and may further include manual operating means selectively operable upon a malfunction of the automatic solenoid actuating means for manually unlatching and moving the valve between the open and closed positions, said manual operating means preferably being arranged when in an operating position for overriding and preventing further operation of the valve by the solenoid actuating means.

Various constructions of shutoff valves are used in installations for the control of the flow of fluids therein. Furthermore, in many of these installations it is required that the fluids flowing through the particular shutoff valve will be drained from the lines connected to the outlet or downstream side thereof when the valve is placed in a closed position interrupting the flow of fluids therethrough, for instance, the shutoff valves used for controlling the flow of fuels in the engine systems of missiles, In many of such installations, a separate drain valve is used connected through relatively complex controls for opening the drain valve automatically upon the closing of the shutoff valve.

Also, particularly in the fuel line and similar installations, it is necessary to provide the shutoff valves with positive, although obviously releasable, latching means for positive latching of the valves in each of the open and closed positions thereof in order to assure prevention of the valves from accidentally moving from the particular intended positions in which they have been placed. This is true, despite the fact that it is necessary to provide these valves remotely automatically operable, the most usual method being through solenoid means which may be remotely electrically actuated. Thus, the valves must be arranged so that actuation thereof by the solenoid means will not only move the valves between the open and closed positions thereof, but will likewise unlatch the same for such movement, all of which has heretofore required the valves to be of a relatively complex nature.

A still further factor to be considered in valves of the type involved herein is the danger of malfunctioning of the particular valves in a system that is at that moment in full operation and absolutely requires the flow control of the particular fluid. Malfunctioning of the valves can occur for many reasons, such as the failure of operation of the particular solenoid actuating means or an interruption in the electrical control for such solenoid means. As a result, prior to the present invention, it has been necessary to provide a separate manually operated valve system which can be manually operated to function in place of the solenoid operated valves, thereby requiring a complete secondary manually operated valve system for bypassing the solenoid actuated valves and eliminating any possible control by the solenoid actuated valves in the event the electrical controls therefor might become intermittently refunctional.

At first thought, it might seem relatively simple to provide some form of manual actuating means directly on the solenoid operated valves so that in the event of malfunctioning of the solenoid controls therefor, the manual actuating means can be brought into operation. The prime deterrent to this solution to the problem, as opposed to the completely separate manually actuated valve system, as discussed above, is the aforesaid danger of intermittent refunctioning of the solenoid actuated controls at an improper moment. For instance, assume that a particular valve having the solenoid actuation thereof in a malfunctioned condition is properly manually moved to open position, while the solenoid actuating means remains in position normally retaining the valve in closed position, if the solenoid actuating means should become refunctional at this particular moment, there is the danger that the solenoid actuating means might improperly move the valve from its intended open position to an unintended closed position. Thus, it is absolutely necessary that once the fluid flow control of a particular system is taken over by manual operation, it must remain controllable only by the manual operation so as to completely eliminate any accidental recontrol by the solenoid actuating means.

It is, therefore, an object of my invention to provide a shutoff and drain valve which serves the dual purpose of transmitting fluids therethrough in the open position and interrupting the flow of fluids therethrough in the closed position, while at the same time, automatically providing drain means when in the closed position for draining fluids from the outlet or downstream side of the valve, thereby eliminating the necessity for a separate drain valve system and the normally required relatively complex separate controls therefor. The shutoff and drain valve of the present invention includes a drain port therein operably connected to the outlet side of the valve for draining downstream fluids therefrom upon the valve moving to closed position. The connection of this drain port to the valve outlet side is arranged such that the valve member in the valve serving to open and close the same for the normal flow of fluids therethrough or the interruption of the flow of fluid therethrough also serves as the means for opening communication from the valve outlet side to the drain port when the valve member is moved to closed position and interrupting such communication when the valve member is moved to open position.

It is a further object of my invention to provide a shutoff and drain valve which automatically positively releases latches in each of the open and closed positions, with said positive latching being provided in a relatively simple and efficient manner. The latching, unlatching and movement of the valve between the open and closed positions is accomplished through relatively axially movable spindle and latch members actuated in such movement by the valve solenoid actuating means. Positive latching for the valve is maintained by engagement means directly between the spindle and latch members in each of the valve latched positions, yet automatically disengaged upon a particular sequence of movement between the spindle and latch members.

It is an additional object of my invention to provide a shutoff and drain valve which is normally operated by solenoid actuating means, but includes manual actuating means which may be selectively operated upon malfunction of the solenoid actuating means and despite the fact that the valve is positively latched in each of the open and closed positions thereof. The manual actuating means is operably connected to the aforesaid spindle and latch members for movement of the members in the same sequence of movement necessary for unlatching the valve member in its respective positions so that such movement is obtained with the manual actuating means in exactly the same manner as if said movement were being carried out by the solenoid actuating means. Thus, the same safety features are provided for positively latching the valve member in each of the open and closed positions thereof whether the movement of the valve member between its positions is being obtained through automatic control of the solenoid actuating means or manual control of the manual actuating means.

It is still an additional object of my invention to provide a shutoff and drain valve having the foregoing alternate automatic solenoid actuation or manual actuation for unlatching the valve member from a positive latched condition in either of the open or closed positions and movement of said valve member to the alternate position, yet the unique construction of the manual actuating means is such as to prevent further accidental control of the valve member by the solenoid actuating means once the manual actuating means has been purposefully brought into operation. The manual actuating means once brought into operation for movement to either of its valve open or valve closed positions is securely, although releasably, retained in the particular position to retain the valve member in that particular valve opening or valve closing position and prevent movement of the valve member except through said manual actuating means and despite the fact that at that time the solenoid actuating means might again be operated. In this manner, the manual actuating means constitutes an overriding manual actuating means which, when brought into operation, will override any further control by the solenoid actuating means, thereby eliminating the danger of operation of the valve at an improper and unintended moment.

Other objects and advantages of the invention will be apparent from the following specification and the accompanying drawings which are for the purpose of illustration only, and in which:

FIG. 1 is a side elevational view of an embodiment of a valve according to the shutoff and drain valve principles of the present invention;

FIG. 2 is an enlarged, fragmentary, vertical, sectional view of the valve of FIG. 1 in the closed position;

FIG. 3 is a view similar to FIG. 2 and showing the valve member actuating means and latching means in position latching the valve member in open position;

FIG. 4 is a horizontal, sectional view taken along the broken line 4—4 in FIG. 3;

FIG. 5 is an enlarged, fragmentary, vertical, sectional view taken from FIG. 2, but showing a different portion of the valve drain passages providing the drain passage communication between the outlet and drain ports thereof;

FIG. 6 is a horizontal, sectional view taken along the broken line 6—6 in FIG. 2;

FIG. 7 is a fragmentary, vertical, sectional view taken along the broken line 7—7 in FIG. 5;

FIG. 8 is a vertical, sectional view taken along the broken line 8—8 in FIG. 5;

FIG. 9 is a fragmentary, vertical, sectional view taken along the broken line 9—9 in FIG. 5; and FIG. 10 is a view similar to FIG. 3, but showing the valve actuating means in an intermediate position between the valve open and closed positions.

Referring to the drawings, the embodiment of the shutoff and drain valve illustrated includes a valve body 20 having inlet and outlet ports 22 and 24 extending longitudinally through the body and opening into a central gate or slide chamber 26 within which is positioned a laterally movable valve member in the form of a gate or slide 28 movable between open and closed positions for controlling the flow of fluids through the inlet and outlet ports. The inlet port 22 opens generally into the slide chamber 26 and retains a coil spring 30 engaged with a hollow cylindrical guide 32 longitudinally resiliently urged by the spring flatwise against the slide 28 within the slide chamber, said guide preferably being formed of a self-lubricating memory plastic. The outlet port 24 is formed by a cylindrical sealing member 34 secured in the valve body 20 and sealed therewith by resilient O-rings 36, with the sealing member terminating within the slide chamber 26 in a laterally extending, sealing end surface 38 and with the outlet port opening through said sealing end surface in a slotted outlet opening 40.

As best seen in FIGS. 2, 5, 7 and 8, a first drain passage 42 is formed longitudinally through the sealing member 34 spaced laterally from the outlet port 24 and opening at one end into the outlet port and at the other end through the sealing end surface 38 spaced laterally from the outlet opening 40 of the outlet port. A second drain passage 44 is also formed in the sealing member 34 spaced laterally from the first drain passage 42, as well as the outlet port 24, with the second drain passage opening at the one end through the sealing end surface 38 of the sealing member and at the other end into an annular distribution groove 46 in the valve body 20 surrounding the sealing member. A drain port 48 is formed through the valve body 20 extending generally longitudinally, although angularly, relative to the inlet and outlet ports 22 and 24, with the drain port communicating inwardly with the distribution groove 46 so as to form a drain opening from the distribution groove through and outwardly of the valve body.

The slide 28 longitudinally separates the inlet and outlet ports 22 and 24 within the slide chamber 26 and is longitudinally resiliently urged by the previously described guide 32 flatwise against the sealing end surface 38 of the sealing member 34. Furthermore, the slide 28 has a slotted flow opening 50 formed longitudinally therethrough similar in configuration and extension to the sealing member outlet opening 40, with the slide being moveable in the slide chamber 26 laterally between an open position in which the flow opening is longitudinally aligned with the sealing member outlet opening 40 providing flow communication between the inlet and outlet ports 22 and 24 and a closed position shown in FIG. 2 in which the flow opening is displaced laterally from the sealing member outlet opening, with the slide sealing against the sealing member sealing end surface 38 and blocking flow through the slide chamber between the inlet and outlet ports. A drain passage in the form of a slot or groove 52 is formed in the slide 28 at the side thereof facing the sealing end surface 38 of the sealing member 34, that is, the side of the slide facing the outlet port 24, with said drain groove being positioned providing fluid flow communication between the first and second drain passages 42 and 44 when the slide is in its closed position, as shown in FIG. 2, and being laterally displaced from said drain passages wherein the slide seals off the drain passages when the slide is in the open position aligning the slide flow opening 50 with the sealing member outlet opening 40, as previously described.

Thus, when the slide 28 is laterally moved or slid to its upper valve closing position, as shown in FIG. 2, the slide flow opening 50 is displaced upwardly from the sealing member outlet opening 40, with the slide sealing against the sealing end surface 38 of said sealing member so as to block flow communication between the inlet and outlet ports 22 and 24. At the same time, laterally upward or closing movement of the slide 28 moves the slide drain groove 52 into alignment with and providing communication between the first and second drain passages 42 and 44 so that fluids, such as fuels, may drain reversely from the outlet ports 24, through the first drain passage 42, through the slide drain groove 52, through the second drain passage 44 and into and from the drain port 48, as indicated by the arrows 54 in FIGS. 1 and 2. When the slide 28 is moved laterally downwardly to the valve opening position aligning the slide flow opening 50 50 with the sealing member outlet opening 40, fluid communication is provided between the inlet and outlet ports 22 and 24 through the slide flow opening, as indicated by the arrows 56 in FIG. 1, so that fluid may flow normally longitudinally through the valve body 20, while laterally downward movement of the slide displaces the slide drain groove 52 spaced laterally downwardly from the first and second drain passages 42 and 44 causing the slide to seal of the drain passages and any fluid flow through the drain port 48.

A valve actuating and latching means for laterally moving the slide 28 between the valve open and closed positions is generally indicated at 58 and includes an actuator frame 62 having a central guide portion 64 with an axially extending cylindrical bore 66 centrally overlying and opening downwardly into the slide chamber 26. Furthermore, the actuator frame 62 is secured sealed on the valve body 20 by the resilient O-ring 68 and supports a solenoid case 70 of a double acting electric solenoid. The solenoid case 70 houses a valve closing annular solenoid coil 72 and a valve opening annular solenoid coil 74, which coils respectively surround and act upon hollow cylindrical valve closing and opening solenoid plungers 76 and 78.

The solenoid plungers 76 and 78 are axially slidable within the solenoid case 70 relative to each other and relative to the guide portion 64, said plungers being axially separated by a hollow cylindrical spacer 80 and axially overlying the frame guide portion. A spindle 82 is positioned axially slidable through the bore 66 of the frame guide portion 64, with said spindle being telescoped by the solenoid plungers 76 and 78, threadably secured to the valve opening solenoid plunger 78 and slidable axially relative to the valve closing solenoid plunger 76. A stem 84 is threadably secured to the lower end of the spindle 82 projecting axially downwardly into the slide chamber 26 and having an annular groove 86 longitudinally slidably receiving inwardly depending tabs 88 of the slide 28, as best seen in FIG. 9.

Telescoped within and axially slidable relative to the spindle 82 is a latch rod 90 having a lower end 92, an upper end 94 and an annular ball receiving groove 96 forming a tapered shoulder 98. Generally radially outwardly adjacent the ball receiving groove 96 of the latch rod 90, the spindle 82 is formed with a series of circumferentially spaced ball openings 100, preferably three in number, receiving latch balls 102. Furthermore, generally radially outwardly of the spindle ball openings 100 and the latch balls 102, the case 70 is formed with a tapered shoulder 104.

Spaced below the ball openings 100, the spindle 82 is formed with the diametrically opposite slots 106 receiving the latch pin 108 of the latch rod 90 therethrough, with the latch pin extending into an annular recess 110 of the valve closing solenoid plunger 76 axially adjacent an engagement shoulder 112. A coil spring 114 is positioned surrounding the spindle 82 axially engaged between the guide portion 64 and the valve opening solenoid plunger 78 resiliently urging said plunger upwardly, and a coil spring 116 is engaged with the latch rod upper end 94 within the spindle 82 resiliently urging the latch rod downwardly relative to the spindle.

A manual actuating lever 118 is clockwise and counterclockwise pivotally mounted on the actuator frame 62 by a crankshaft 120 rotatably received axially through the actuator frame, as best seen in FIGS. 1 and 6. The crankshaft 120 is pinned to the lever 118 for movement therewith and secured to the inner end of the crankshaft is a bellcrank arm 122 supporting an actuating pin 124 spaced radially from the crankshaft. The actuating pin 124 projects through diametrically opposite slots 126 in the spindle 82 below the lower end 92 of the latch rod 90, as best seen in FIGS. 2, 3 and 10, said spindle slots having lower ends 128 and upper ends 130.

As shown in FIG. 6, the crankshaft 120 is provided with a usual sealing ring 132 intermediate the crankshaft extension through the frame 62. Also intermediate the frame 62, the crankshaft 120 is formed on the outer surface thereof with three equally circumferentially spaced detent sockets 134 particularly positioned for cooperation with a spring pressed detent member 136 slidably received in the frame 62 and resiliently urged toward the crankshaft 120 by a compression spring 138. The spacing and location of the dent sockets 134 in the crankshaft 120 is precisely determined for securely, although releasably, retaining the crankshaft and, therefore, the bellcrank arm 122, the actuating pin 124 and the manual actuating lever 118 in each of three determined positions.

Referring to both FIGS. 1 and 6, when the manual actuating lever 118 is in a neutral position, as shown in FIG. 1, the detent member 136 is engaged in the center of the detent sockets 134 releasably retaining the actuating lever in the neutral position, as well as the various components connected thereto and movable therewith. When the actuating lever 118 is rotated or pivoted clockwise, as viewed in FIG. 1, until it engages a closing stop 140 on the valve body 20, the detent member 136 moves from the central of the detent sockets 134 and engages in the upper of the sockets, retaining the actuating lever 118 in a valve closed position. When the actuating lever 118 is rotated or pivoted from the neutral position counterclockwise to engage an opening stop 142, the detent member 136 releases from the central detent socket 134 and engages in the lower of the detent sockets.

Thus, the manual actuating lever 118 is selectively movable from the neutral position shown in FIG. 1 clockwise to a valve closed position, as determined by engagement of the lever with the closing stop 140, and is movable from the neutral position counterclockwise to the valve open position, as determined by engagement thereof with the opening stop 142. Furthermore, the manual actuating lever 118, as well as the actuating pin 124 controlled thereby, is securely releasably retained in each of the neutral, valve closed and valve open positions by the engagement of the detent member 136 in the appropriate detent socket 134. The importance of the described position retainment of the manual actuating lever 118, the operation of the various elements and components connected thereto, and the operation of the other elements and components of the valve actuating and latching means 58 will be more clearly understood from the description of the operation of the valve, as set forth below.

In the operation of the valve, illustrated and described herein, assume that the valve is on automatic actuation by the double acting solenoid 60 wherein the manual actuating lever 118 will be in the neutral position, shown in FIG. 1, pivotally midway of the closing and opening stops 140 and 142 and retained in said neutral position by the detent member 136. With the manual actuating lever 118 in the neutral position shown, the actuating pin 124 is in a neutral position, as shown in FIGS. 2, 3 and 10, and this is true whether the slide 28 and the various actuating mechanism therefor through the solenoid 60 are in the valve closed position, the valve open position or moving therebetween. Thus, in neutral position, the manual actuating lever 118 and the actuating pin 124 have no effect upon the normal automatic operation of the slide 28 by the solenoid 60.

Starting with the valve in the closed and downstream draining position, as shown in FIGS. 2 and 5, the slide 28 has been moved upwardly, displacing the flow opening 50 thereof from the outlet port outlet opening 40 so as to seal off said outlet opening and block communication between the inlet and outlet ports 22 and 24, while at the same time, such movement of the slide places the slide drain groove 52 aligned with and in communication with the first and second drain passages 42 and 44, draining the downstream fluid, such as fuel, into and from the drain port 48, as previously described. In such valve closed position, both the spindle 82 and latch rod 90 are in upper positions, with the valve opening solenoid plunger 78 spaced upwardly from the actuator frame guide portion 64, the valve closing solenoid plunger 76 upwardly abutting the solenoid case 70 and the latch pin 108 of the latch rod 90 intermediate the spindle slots 106 and the recess 110 of the valve closing solenoid plunger 76. Also, the coil spring 114 resiliently urging the valve opening solenoid plunger 78 upwardly being stronger than the coil spring 116 bearing resiliently against the latch rod upper end 94, coil spring 114 has forced the spindle 82 and latch rod 90 upwardly as explained in describing the operation of the solenoid plunger 76 below. As a result, the latch balls 102 are displaced upwardly and inwardly from the solenoid case tapered shoulder 104 and said latch balls 102 project inwardly engaged beneath the latch rod tapered shoulder 98, thereby positively releasably locking or latching the slide 28 in the valve closed position, as shown.

Actuation or energization of the valve opening solenoid coil 74 causes the valve opening solenoid plunger 78 to be drawn axially downwardly against the force of the coil spring 114 into the position shown in FIG. 3 abutting the actuator frame guide portion 64. Downward movement of the valve opening solenoid plunger 78 likewise draws the spindle 82 axially downwardly, moving the latch balls 102 into radial alignment with the solenoid case tapered shoulder 104 so that the latch balls may move radially outwardly against said tapered shoulder, thereby disengaging the latch rod tapered shoulder 98 and permitting the coil spring 116 to force the latch rod 90 downwardly to the position shown in FIG. 3 wherein the latch rod tapered shoulder 98 is axially displaced downwardly from the latch balls 102 and the latch rod will retain the latch balls radially outwardly engaged with the solenoid case tapered shoulder 104. In other words, upon the spindle 82 being drawn downwardly by actuation of the valve opening solenoid coil 74, the latch balls 102 are free to move radially outwardly against the solenoid frame tapered shoulder 104, no longer being blocked from such movement by the solenoid case 70, and the downward urging of the latch rod 90 by the coil spring 116 causes the latch rod tapered shoulder 98 to force the latch balls radially outwardly disengaging the latch balls from the latch rod and permitting the downward movement of the latch rod by the spring 116.

The downward movement of the spindle 82 to the position shown in FIG. 3 moves the slide 28 downwardly to the valve open position in which the slide flow opening 50 is aligned with the outlet port outlet opening 40 providing flow communication between the inlet and outlet ports 22 and 24, with the slide drain groove 52 being displaced downwardly from the first and second drain passages 42 and 44 closing off reverse drain flow into and through the drain port 48. In view of the latch balls 102 now being engaged with the solenoid case tapered shoulder 104 and prevented from moving from such engagement by the blocking of the latch rod 90, the slide 28 is positively releasably latched or retained in the valve open position. It will be noted that during such valve opening described movement, as well as the valve closing movement, to be hereinafter described, the actuating pin 124 for the manual actuating lever 118 being in the neutral position will have no effect on such movement by the solenoid 60.

As shown in FIG. 3, during the downward movement of the latch rod 90 from the valve closed to the valve open position, the latch pin 108 of the latch rod has moved downwardly in the recess 110 of the valve closing solenoid plunger 76 to engage the engagement shoulder 112 thereof. Thus, upon actuation or energization of the valve closing solenoid coil 72, the valve closing solenoid plunger 76 is drawn upwardly into the position shown in FIG. 10 upwardly abutting the solenoid case 70 and through the engagement shoulder 112, drawing the latch pin 108 and latch rod 90 upwardly. Upward movement of the latch rod 90 relative to the spindle 82 displaces the latch rod from blocking the radial inward movement of the latch balls 102 so that the ball receiving groove 96 of the latch rod is positioned ready to receive the latch balls underlying and engaged with the latch rod tapered shoulder 98, as shown in FIG. 10.

At the intermediate stage of movement, as shown in FIG. 10, the spindle 82 has not yet moved upwardly so that the slide 28 is still in the downward valve open position. Instantaneously, however, upon the latch balls 102 being released for radial inward movement by the lack of blocking of the latch rod 90, the coil spring 114 will move the valve opening solenoid plunger 78 upwardly from the position shown in FIG. 10 to the valve closed position shown in FIG. 2, moving the spindle 82 upwardly and causing the latch balls to move inwardly to again latch with the latch rod 90, as shown. Upward movement of the spindle 82 will move the slide 28 upwardly into valve closed position, opening the downstream drain to the drain port 48, as previously described.

In the event of malfunctioning of the solenoid 60, necessitating manual operation of the valve, and assuming the valve is in the closed position, as shown in FIG. 2, movement of the manual actuating lever 118 from the neutral position shown in FIG. 1 in the counterclockwise direction engaged against the opening stop 142 will cause the crankshaft 120 and bellcrank arm 122 to move the actuating pin 124 downwardly engaged with the lower ends 128 of the spindle slots 126 to thereby move the spindle 82 downwardly, moving the slide 28 from the valve closed position shown in FIG. 2 downward to the valve open position, as previously described. Also, the downward movement of the spindle 82 will cause the previously described unlatching by the latch balls 102, permitting the following downward movement by the latch rod 90 and the relatching of the spindle and slide 28 in the valve open position, as shown in FIG. 3. Upon the movement of the manual actuating lever 118 to such valve open position, the detent member 136 will releasably reengage with the lower of the detent sockets 134 on the crankshaft 120, thereby retaining the actuating pin 124 in its lower valve open position, as well as consequently retaining the spindle 82 and slide 28 in the lower valve open position.

For then closing the valve, the manual actuating lever 118 is moved from against the opening stop 142 clockwise until said lever engages the closing stop 140. Such movement of the manual actuating lever 118 moves the actuating pin 124 upwardly within the spindle slots 126 and into engagement with the latch rod lower end 92, as shown in FIG. 3, so that the full described movement of the manual actuating lever 118 causes the actuating pin 124 to move the latch rod 90 upwardly within the spindle 82 from the position shown in FIG. 3 to the position shown in FIG. 10. The latch balls 102 will, therefore, be permitted to unlatch and permit the coil spring 114 to force both solenoid plungers 76 and 78, and the spindle 82 upwardly, as previously described, moving the slide 28 to its upward valve closed position, as shown in FIG. 2, with the latch balls 102 positively relatching the same in said position, the detent member 136 now engaging in the upper of the detent sockets 134 for secure retainment of the various components in the valve closed position.

It is important to certain of the principles of the present invention that the engagement of the detent member 136 in any one of the detent sockets 134 will be sufficiently strong to overcome any urging of movement of the spindle 82 and latch rod 90 by either of the valve closing or valve opening solenoid plungers 76 or 78 once the manual actuating lever 118 has been brought into operation for manually actuating the valve between the valve open and closed positions, that is, once the solenoid 60 has malfunctioned necessitating such manual actuattion. In other words, upon the manual actuating lever 118 and the actuating pin 124 being brought into use upon a malfunctioning of the solenoid 60, such manual actuating system constitutes a manual override for the automatic actuation by the solenoid 60 and positively prevents later accidental automatic actuation of the valve which could disturb the intended positioning thereof. This is important in order that the valve will be in the intended valve open or closed position and will be moved between these positions at the proper intended time, thereby eliminating the obvious possible consequences of improper and unintended valve movement or shifting, particularly when the valve is installed in a fuel system and the like.

Assume, for instance, that the malfunctioning of the solenoid 60 has been caused by a loose electrical connection thereto. There is always the possibility that this loose electrical connection, although at the moment disconnected, might accidentally reconnect at any time. Such a reconnection could obviously cause unintended movement of the valve unless the manual actuating system is an overriding system, as described.

According to my invention, therefore, a shutoff and drain valve is provided serving the dual function of operating as a usual flow valve in open and closed position, but also simultaneously acting as a downstream drain valve in the closed position thereof, thereby eliminating the necessity of providing a separate drain valve with the necessary controls therefor, as in the prior constructions. Furthermore, the valve of the present invention is positively releasably latched in each of the valve open and valve closed positions, whether automatically solenoid or manually actuated. In addition, the manual actuating system of the valve of the present invention is an overriding system which will prevent any actuation of the valve by the automatic solenoid actuating system once the manual actuating system has been brought into use, eliminating the necessity of providing means in a particular fluid flow system for eliminating the automatically solenoid actuated valve from the system upon malfunctioning of the solenoid and the switching into the system of a separate manually actuated valve.

I claim:

1. A shutoff and drain valve including, a body forming a valve chamber, inlet and outlet ports communicating through said body and into said valve chamber, a valve member in said valve chamber movable between a closed position blocking flow through said valve chamber between said inlet and outlet ports and an open position permitting flow between said inlet and outlet ports, a drain port in said body, drain passages partially in said body and partially in said valve member communicating from said outlet port through said valve member to said drain port when said valve member is in said closed position and being free of said communication when said valve member is in said open position, and means for moving said valve member between said open and closed positions.

2. A shutoff and drain valve as defined in claim 1 in which said drain passages include body drain passages from said outlet port to said valve member and from said valve member to said drain port, a valve member slot, said member slot communicating between said body drain passages when said valve member is in said closed position and being displaced from at least one of said body drain passages when said valve member is in said open position.

3. A shutoff and drain valve as defined in claim 1 in which said valve member includes a slide slidable movable between said open and closed positions; and in which said drain passages include body drain passages from said outlet port to said valve member slide and from said valve member slide to said drain port, a slot in said valve member slide aligned with and communicating between said body drain passages when said valve member slide is in said closed position and displaced from and being free of communication between said body drain passages when said valve member slide is in said open position.

4. A shutoff and drain valve as defined in claim 1 in which said valve member includes a slide slidably movable between said open and closed positions, said valve member slide having a flow passage formed therethrough communicating between said inlet and outlet ports when said valve member slide is in said open position, said flow passage being displaced from communication between said inlet and outlet ports and said valve member slide blocking communication between said inlet and outlet ports when said valve member slide is in said closed position; and in which said drain passages include body drain passages from said outlet port to said valve member slide and from said valve member slide to said drain port, a slot in said valve member slide communicating between said body drain passages when said slide is in said closed position and being displaced from and free of communication between said body drain passages when said slide is in said open position, said valve member slide sealing off said body drain passages when said slide is in said open position.

5. A shutoff and drain valve as defined in claim 1 in which said means for moving said valve member includes releasable latching means positively latching said valve member in each of said open and closed positions, means operable for unlatching said valve member in each of said open and closed positions and moving said valve member into the other of said positions.

6. A shutoff and drain valve as defined in claim 1 in which said means for moving said valve member includes releasable latching means positively latching said valve member in each of said open and closed positions, double acting solenoid means operably connected to said valve member actionable in one of opening and closing directions for unlatching and moving said valve member to the corresponding of said open and closed positions and actionable in the other of said opening and closing directions for unlatching said valve member, resilient means operably connected to said valve member for moving said valve member between said corresponding positions upon said unlatching of said valve member by said solenoid means moving in said other of said opening and closing directions.

7. A shutoff and drain valve as defined in claim 1 in which said means for moving said valve member includes releasable latching means positively latching said valve member in each of said open and closed positions, solenoid means operable for movement to at least unlatch said valve member in each of said valve member open and closed positions, manual operating means selectively movable from a neutral position to actuating positions and operable for at least unlatching said valve member in each of said valve member open and closed positions from said actuating positions, means operably connected to said manual operating means when in said actuating positions for preventing movement of said solenoid means by operation of said solenoid means.

8. A shutoff and drain valve as defined in claim 1 in which said means for moving said valve member includes releasable latching means positively latching said valve member in each of said open and closed positions, double acting solenoid means operably connected to said valve member actionable in one of opening and closing directions for unlatching and moving said valve member to the corresponding of said open and closed positions and actionable in the other of said opening and closing directions for unlatching said valve member, manual operating means operably connected to said valve member actionable in one of opening and closing directions for unlatching and moving said valve member to the corresponding of said open and closed positions and actionable in the other of said opening and closing directions for unlatching said valve member, resilient means operably connected to said valve member for moving said valve member between said corresponding positions upon said unlatching of said valve member by either of said solenoid means and manual operating means moving in said other of said opening and closing directions.

9. A shutoff and drain valve as defined in claim 1 in which said means for moving said valve member includes releasable latching means positively latching said valve member in each of said open and closed positions, solenoid means operable for movement to at least unlatch said valve member in each of said valve member open and closed positions, manual operating means selectively movable from a neutral position to actuating positions and operable for at least unlatching said valve member in each of said valve member open and closed positions from said actuating positions, means operably connected to said manual operating means when in said actuating positions for preventing movement of said solenoid means by operation of said solenoid means; in which said valve member includes a slide slidably movable between said open and closed positions, said valve member slide having a flow passage formed therethrough communicating between said inlet and outlet ports when said valve member slide is in said open position, said flow passage being displaced from communication between said inlet and outlet ports and said valve member slide blocking communication between said inlet and outlet ports when said valve member slide is in said closed position; and in which said drain passages include body drain passages from said outlet port to said valve member slide and from said valve member slide to said drain port, a slot in said valve member slide communicating between said body drain passages when said slide is in said closed position and being displaced from and free of communication between said body drain passages when said slide is in said open position, said valve member slide sealing off said body drain passages when said slide is in said open position.

10. A shutoff valve including a body forming a valve chamber, inlet and outlet ports communicating through said body and into said valve chamber, a valve member in said valve chamber movable between a closed position blocking flow through said valve chamber between said inlet and outlet ports and an open position permitting flow between said inlet and outlet ports, and actuating means for moving said valve member between said open and closed positions, releasable latching means forming a part of said actuating means positively latching said valve member in each of said open and closed positions, solenoid means forming a part of said actuating means operable for movement to at least unlatch said valve member in each of said valve member open and closed positions, manual operating means forming a part of said actuating means selectively movable from a neutral position to actuating positions and operable for at least unlatching said valve member in each of said valve member open and closed positions from said actuating positions, means operably connected to said manual operating means when in said actuating positions for preventing movement of said solenoid means by operation of said solenoid means.

11. A shutoff valve as defined in claim 10 in which said solenoid means includes double acting solenoid means operably connected to said valve member actionable in one of opening and closing directions for unlatching and moving said valve member to the corresponding of said open and closed positions and actionable in the other of said opening and closing directions for unlatching said valve member; in which said actuating means includes resilient means operably connected to said valve member for moving said valve member between said corresponding positions upon said unlatching of said valve member by said solenoid means moving in said other of said opening and closing directions; and in which said manual operating means is operably connected to said valve member for remaining stationary in said neutral position during said movement of said valve member by said solenoid means and said resilient means.

12. A shutoff valve as defined in claim 10 in which said solenoid means includes double acting solenoid means operably connected to said valve member actionable in one of opening and closing directions for unlatching and moving said valve member to the corresponding of said open and closed positions and actionable in the other of said opening and closing directions for unlatching said valve member; in which said manual operating means includes means operably connected to said valve member actionable in one of opening and closing directions for unlatching and moving said valve member to the corresponding of said open and closed positions and actionable in the other of said opening and closing directions for unlatching said valve member; in which said actuating means includes resilient means operably connected to said valve member for moving said valve member between said corresponding positions upon said unlatching of said valve member by either of said solenoid means and manual operating means moving in said other of said opening and closing directions; and in which said manual operating means is operably connected to said valve member for remaining stationary in said neutral position during said movement of said valve member by said solenoid means and said resilient means.

References Cited

UNITED STATES PATENTS

| 2,515,029 | 7/1950 | Almond et al. | 137—625.65 |
| 2,547,098 | 4/1951 | Smith et al. | 251—66 |
| 2,851,056 | 9/1958 | MacGlashan et al. | 137—625.25 XR |
| 3,016,920 | 1/1962 | Thomsen et al. | 251—130 XR |
| 3,357,677 | 12/1967 | Tasker | 251—106 |

HENRY T. KLINKSIEK, *Primary Examiner.*

U.S. Cl. X.R.

251—130, 137, 77